United States Patent [19]
Hatano et al.

[11] 4,051,471
[45] Sept. 27, 1977

[54] KEY INPUT MEANS PROVIDING COMMON KEY IDENTIFYING AND DISPLAY DRIVING DIGIT TIMING SIGNALS

[75] Inventors: Isao Hatano, Kyoto; Akira Nagano, Nagaokakyo; Kazuaki Urasaki, Muko, all of Japan

[73] Assignee: Omron Tateisi Electronics Co., Kyoto, Japan

[21] Appl. No.: 528,321

[22] Filed: Nov. 29, 1974

[30] Foreign Application Priority Data
Nov. 30, 1973  Japan ................. 48-135565

[51] Int. Cl.² .............................................. G06F 3/02
[52] U.S. Cl. ............................ 340/365 S; 340/365 R
[58] Field of Search ............. 340/365 S, 365 E, 354, 340/146.1 AB, 365 R, 337

[56] References Cited
U.S. PATENT DOCUMENTS

| | | | |
|---|---|---|---|
| 3,590,158 | 6/1971 | Pabst | 340/365 S |
| 3,594,781 | 7/1971 | Gerjets | 340/365 S |
| 3,675,239 | 7/1972 | Ackerman et al. | 340/365 S |
| 3,715,746 | 2/1973 | Hatano | 340/365 S |
| 3,717,871 | 2/1973 | Hatano et al. | 340/365 S |
| 3,778,815 | 12/1973 | Wright | 340/365 S |
| 3,818,441 | 6/1974 | Nomiya et al. | 340/146.1 AB |
| 3,834,616 | 9/1974 | Washizuka et al. | 340/365 S |
| 3,883,867 | 5/1975 | Hatano et al. | 340/365 R |
| 3,950,743 | 4/1976 | Hatano et al. | 340/365 S |

Primary Examiner—John W. Caldwell
Assistant Examiner—James J. Groody
Attorney, Agent, or Firm—Birch, Stewart, Kolasch & Birch

[57] ABSTRACT

A keying input apparatus is provided which includes; a bit pattern generator responsive to a clock signal for generating different bit patterns of four bits, in a bit sequence and a decoding matrix for converting the different bit patterns at every fourth bit, into individual digit timing signals. A plurality of key switches are connected at one end thereof with corresponding ones of the digit timing signals and connected to a common terminal at the other ends thereof, to drive a gate responsive to the common connected output of said key switches for allowing a coded signal representative of a particular depressed key to be withdrawn from the bit pattern generator and transfer it to a circulation register for storing the coded signal. Depression of a given key thus enables the gate at a corresponding digit timing to load a coded signal corresponding to that digit timing in the register, so that the coded signal as stored in the register uniquely identifies the depressed key.

23 Claims, 6 Drawing Figures

KEY INPUT MEANS PROVIDING COMMON KEY IDENTIFYING AND DISPLAY DRIVING DIGIT TIMING SIGNALS

BACKGROUND OF THE INVENTION:

1. Field of the Invention:

The present invention relates to a keying input apparatus, and more particularly to a keying input apparatus used in electronic equipment such as an electronic calculator.

2. Description of the Prior Art:

A key board having a plurality of key switches is used for electronic calculators. The conventional key board is constructed such that a given voltage is commonly applied to one end of each key switch and the other end of each key switch is connected to the circuit body having storage, calculation and control functions. Therefore, terminals or pins the number of which corresponds to the number of the key switches are required for the circuit body, and accordingly, individual wirings corresponding to. the number of key switches are also required. An integrated circuit is used in the circuit body of an ordinary electronic calculator. However, such an integrated circuit becomes exceedingly expensive, as the number of terminals or pins is increased. Accordingly, it is necessary to minimize the number of the terminals or pins in order to minimize the cost of the integrated circuit.

In order to solve such technical problem, the present applicant has proposed several keying input apparatuses. In a typical apparatus embodying the present invention, the digit timing signals of the display device are supplied individually to one side of the key switches, and the other side of each of the the key switches are connected commonly to an integrated circuit. A circuit for generating coded signals for identifying a depressed key generates a corresponding coded signal in response to the digital timing signal fed through the depressed key. According to such a keying input apparatus, means are required to generate the digit timing signal and the coded signal in synchronism with each other, resulting in complex circuit construction within the integrated circuit.

Therefore, it is an object of the present invention to reduce the number of the terminals and the wirings provided in the circuit body in keying input apparatus, thereby providing coded signals for identifying a depressed key with a simple construction of the apparatus.

SUMMARY OF THE INVENTION

Briefly stated, this invention generates different bit patterns of a plurality of bits sequentially, with which bit patterns the digit timing signals are generated individually corresponding to key switches, whereby the depressed key is identified by the bit pattern corresponding individually to the key switch.

According to the present invention, the number of the terminals and wirings provided in the circuit body is reduced, and the coded signals for identification of the depressed key are obtained through a simple construction, since means and steps are saved for generating the code signals in synchronism with a digit timing signal generating circuit provided separately in the keying input apparatus.

Figure 1:
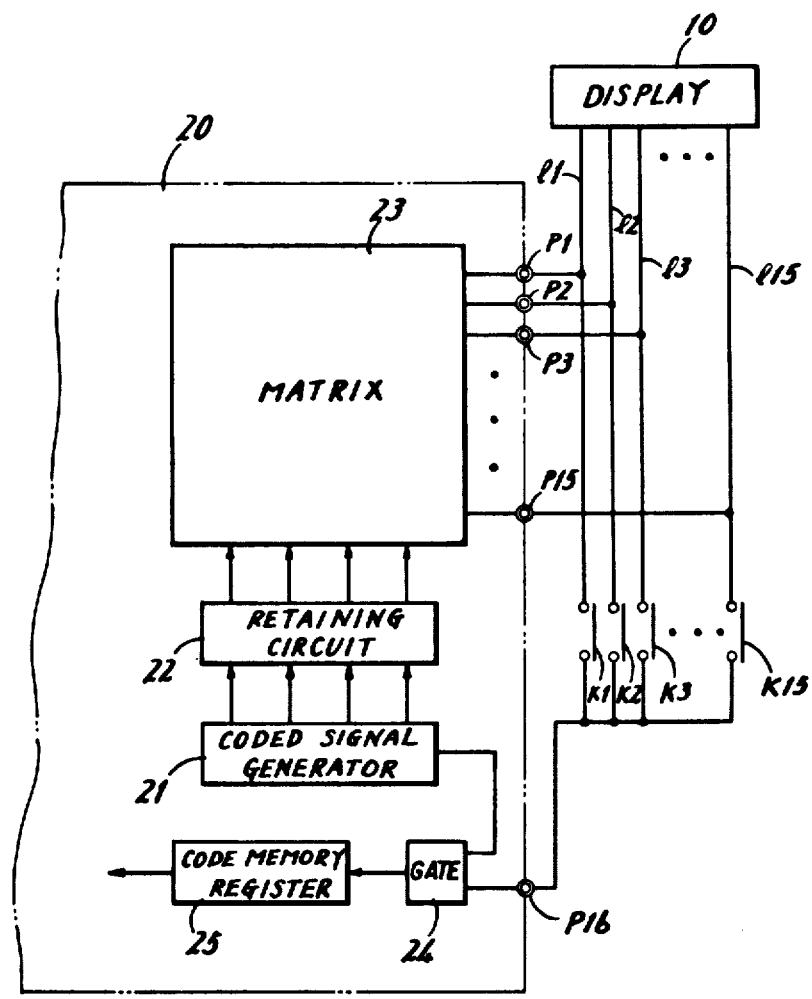
FIG. 1 is a schematic diagram of one embodiment of the present invention.

DESCRIPTION OF THE PREFERRED EMBODIMENTS:

FIG. 1 shows a schematic diagram of one embodiment in accordance with the present invention. A plurality of key switches K1 to K15 are individually connected at one side thereof to mutual connecting lines L1 to L15, respectively, running between a display device 10, which displays output information from a calculator in a form of numerals or letters, and a circuit body 20, which provides digit timing signals for time sharing operation to the display device 10. The display device 10 is an information display device wherein a plurality of information display digit positions are drivingly displayed in a digit timing sequence, which comprises a plurality of information display digit positions, means for enabling the digit positions in a timing sequence, namely, a digit driving circuit, and means for selectively supplying the information to be displaced in the digit positions in respose to the enabling timing sequence.

A coded signal generating circuit 21 generates different big patterns of four parallel bits, for each bit timing, in response to bit pulses.

In this embodiment, four bit pulses constitute one digit, and fifteen digit pulses constitutes one word.

A retaining circuit 22 extracts and retains a particular bit pattern for each one digit timing period. A matrix circuit 23 receives a retaining output to generate the digit timing signals, which are applied to line 1 to line 15 in a timing sequence through the output terminals P1 to P15, respectively.

The other ends of key switches K1 to K15 are commonly connected to activate the retaining circuit 24 through an input terminal p16. Coded signals a particular corresponding to each key are generated from a coded signal generating circuit 21 and are stored in a code memory register 25 through the retaining circuit 24.

By depressing a particular given key during operation, a corresponding digit timing signal from the terminals P1-P15 of matrix circuit 23 based on the coded signal generating circuit 21 enables the retaining circuit 24, through the terminal P16 of the gate 24a. At this time, a coded signal from the coded signal generating circuit 21 corresponding to the particular depressed key is stored in the code memory register 25 through the retaining circuit 24. Thus, by a set of different bit patterns from the coded signal generating circuit 21, a set of digit timing signals is obtained, while a coded signal for identifying the particular depressed key is obtained.

Figure 2:
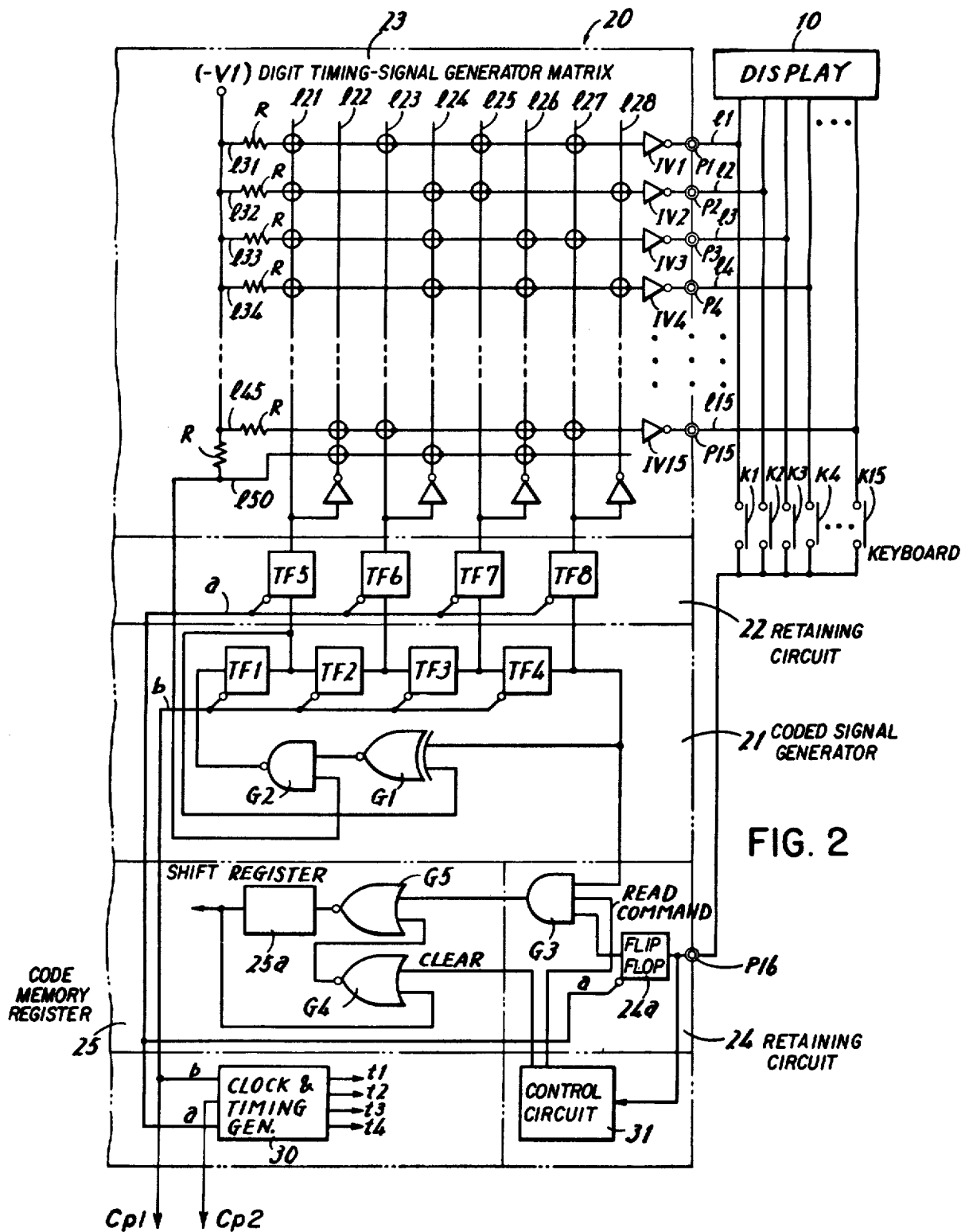
FIG. 2 shows a detailed schematic diagram of the embodiment of FIG. 1.
Figure 2A:
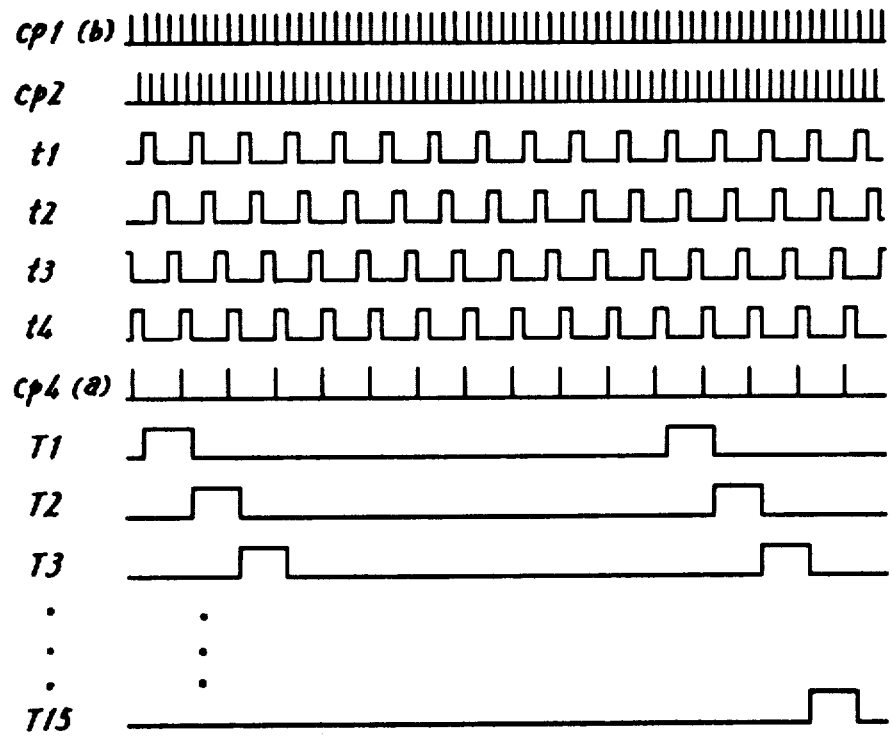
FIG. 2A shows wave forms of various clock and timing signals used in the FIG. 2 embodiment.

FIG. 2 shows a detailed schematic diagram of the embodiment of FIG. 1 and FIG. 2A shows wave forms of various clock and timing signals used in the FIG. 2 embodiment.

Referring to the FIGS. 2 and 2A, in a typical electronic calculator, two series of clock pulses, cp1 and cp2, out of phase with each other, are generated by a well known clock signal generator 30 for two phase operation of the circuit. Based on these series of clocks cp1 and cp2, four sets of bit timing signals, t1, t2, t3 and t4, are generated by the generator 30. In the embodiment shown another set of clock pulses cp4, which is a logical product of the clock cp1 and the bit timing signal t4, is generated by the generator 30. In accordance with the present invention the digit timing signals T1, T2, T3 . . . T15 are generated in a unique manner, as to be more fully described hereinafter. It is to be pointed out that in the following description the clock signals cp1 and cp4 are referred to as the basic clock signals (b) and (a), respectively.

The coded signal generating circuit inside the circuit body 20 comprises four delayed type flip-flops TF1, TF2, TF3 and TF4, connected in series, the outputs of the flip-flops TF1 and TF4 being fed to an input of an exclusive NOR gate G1 individually. The output of the exclusive NOR gate G1 is fed to the input of the flip-flop TF1 through a NAND gate G2, whereby a circulating register is constituted. The delay type flip-flop, often referred to as a D type flip-flop is such a flip-flop as to store input logics when the abovementioned basic clock signal "b" is given. The character "b" in FIG. 2 denotes the basic clock pulse cp1 which occurs at each bit time, and the character "a" denotes the clock pulse cp4 which occurs at each digit time. The D type flip-flops TF5 tp TF8 of the retaining circuit 22 receive the outputs from the D type flip-flops TF1 to TF4, respectively. The D type flip-flops TF5 to TF8 store the logical state of the D type flip-flops TF1 to TF4, respectively, in the last bit timing signal T4 of each of the digit timing signals T1 to T15 to maintain them for one digit time.

Figure 3:
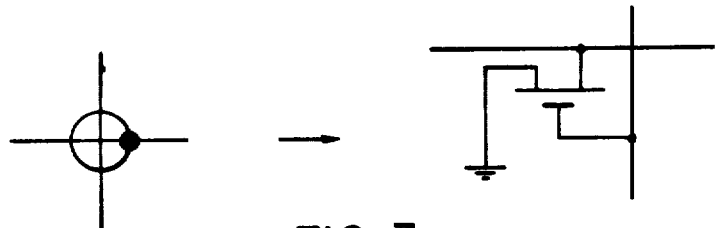
FIG. 3 is a schematic diagram of MOSFET of a matrix circuit.

Column signal lines l21 to l28 of the matrix circuit 23 receive the direct outputs and the inversion outputs from the D type flip-flops TF5 to TF8. One end of each of the row signal lines l31 to l45 corresponding to lines l1 to l15, respectively, is coupled to output terminals P1 to P15 through inverters IV1 to IV15, respectively, while one end of each of the column signal lines l31 to l45 are commonly connected to a negative voltage −V1 volt (logical "0" ) through a respective resistor, which may be a load MOS transistor. MOS electric field effect transistors (MOSFET) are properly provided in the intersections between the row signal lines l31 to l45 and the column signal lines l21 to l28, whereby the bit pattern variations of the D type flip-flops TF5 to TF8 are converted into the individual output of the digit timing sequence, and the digit timing signals T1 to T15 is fed to the lines l1 to l15, respectively, Each MOSFET is connected as illustrated in FIG. 3, its gate electrode being connected to the column signal line, the two remaing electrodes being connected to the row signal line and ground (logic "1"), respectively. This MOSFET is cut off when the voltage of the gate electrode, namely, the voltage of the column signal line is 0 volt (logic "1") and is adapted to be conducted when it is −V2 volt (logic "0").

A NAND'ed output by means of MOSFET's of the inversion output from only the D type flip-flops TF5 to TF5 is fed to the other input of the NAND gate G2 through a line l50. A common terminal of key switches K1 to k15 is connected to a D type flip-flop 24a and to a control circuit 31 of well known type for control of operation of the apparatus. The D type flip-flop 24a delays a digit timing signal fed through a depressed key for the subsequent one digit time to enable the AND gate G3 as a function of the clock signal "a". A read command signal from the control 31 inside the calculator and an output of the D type flip-flop TF4 are also supplied to the AND gate G3. The output of the AND gate G3 is inputted to a shift register 25a through a NOR gate G5. The shift register 25a is provided with four stages, and can store a logical output received in a bit timing sequence from the D type flip-flop TF4 during one digit time. The shift register 25a and NOR gates G4 and G5 constitute a closed loop to form a circulating register or a code memory register 25. A clear signal is supplied from the control 31 to the NOR gate G4, whereby content of the shift register 25a can be cleared.

Let it be assumed that as an initial condition of the operation all the D type flip-flops TF1 to TF4 are to be logic "1" during generation of the last bit timing signal T4 of the digit timing signal T15. The logical state is retained during a period of the next digit timing signal T1 in each of the D type flip-flops TF5 to TF8 of the retaining circuit 22. At first, during a retaining period of the digit timing signal T1, the column signal lines l21, l23, l25 and l27 are 0 volt (logic "1") and thus all the MOSFET on the row signal lines 31 are cut off, whereby the row signal line l31 is retained to −V1 volt (logic "0"). Accordingly, the signal line l1 is logic "1".

On the other hand, although the row signal line l32 tends to be retained at −V1 volt, since the MOSFET element provides at the intersections among the column signals l21 and l25 and the row signal line l32 are cut off, at this time, the MOSFET elements provided at the intersections of the column signal lines l24 and l28 and the row signal line l32 are conducted electrically, whereby the row signal line l32 is forced to be 0 volt (logic "1") by means of the resistor R. Accordingly, the signal line l2 is logic "0". Similarly, the lines l3 to l13 are logic "0", respectively. In this manner, only the line l1 becomes logic "1" during a duration period of the digit timing signal T1.

In the digit timing signal T1, the column signal lines l22, l24, l26 and l28 are logic "0" and thus the line l50 becomes logic "1". At the time of generation of the bit timing signal t1, an exclusive NOR gate G1 output is logic "1" and accordingly the NAND gate G2 output becomes "0". Thus, the bit pattern of the D type flip-flops TF1 to TF4 becomes "0111". At the time of generation of the bit timing signal t2, the output of the exclusive NOR gate G1 is logic "0". Therefore, the output of the NAND gate G2 becomes logic "1", and accordingly the bit pattern of the D type flip-flops TF1 to TF4 becomes "1011". Such logical operation is shown in the following table. In the following table, the logical state of the digit timing signals T5 to T15 is omitted.

| digit timing signal | bit timing signal | D type flip-flop of coded signal generating circuit | | | | D type flip-flop of retaining circuit | | | |
|---|---|---|---|---|---|---|---|---|---|
| | | TF 1 | TF 2 | TF 3 | TF 4 | TF 5 | TF 6 | TF 7 | TF 8 |
| T 15 | t 4 | 1 | 1 | 1 | 1 | 0 | 0 | 0 | 1 |

-continued

| digit timing signal | bit timing signal | D type flip-flop of coded signal generating circuit | | | | D type flip-flop of retaining circuit | | | |
|---|---|---|---|---|---|---|---|---|---|
| | | TF 1 | TF 2 | TF 3 | TF 4 | TF 5 | TF 6 | TF 7 | TF 8 |
| T 1 | t 1 | 0 | 1 | 1 | 1 | 1 | 1 | 1 | 1 |
| | t 2 | 1 | 0 | 1 | 1 | | | | |
| | t 3 | 0 | 1 | 0 | 1 | | | | |
| | t 4 | 1 | 0 | 1 | 0 | | | | |
| T 2 | t 1 | 1 | 1 | 0 | 1 | 1 | 0 | 1 | 0 |
| | t 2 | 0 | 1 | 1 | 0 | | | | |
| | t 3 | 0 | 0 | 1 | 1 | | | | |
| | t 4 | 1 | 0 | 0 | 1 | | | | |
| T 3 | t 1 | 0 | 1 | 0 | 0 | 1 | 0 | 0 | 1 |
| | t 2 | 0 | 0 | 1 | 0 | | | | |
| | t 3 | 0 | 0 | 0 | 1 | | | | |
| | t 4 | 1 | 0 | 0 | 0 | | | | |
| T 4 | t 1 | 1 | 1 | 0 | 0 | 1 | 1 | 0 | 0 |
| | t 2 | 1 | 1 | 1 | 0 | | | | |
| | t 3 | 1 | 1 | 1 | 1 | | | | |
| | t 4 | 0 | 1 | 1 | 1 | | | | |
| T 5 ≈ | t 1 ≈ | 1 | 0 | 1 | 1 | ≈ 0 | 1 | 1 | 1 |
| | t 4 | 1 | 1 | 0 | 1 | | | | |
| T 6 | t 4 | 0 | 1 | 0 | 0 | 1 | 1 | 0 | 1 |
| T 7 | t 4 | 1 | 1 | 0 | 0 | 0 | 1 | 0 | 0 |
| T 8 | t 4 | 1 | 0 | 1 | 1 | 1 | 1 | 0 | 0 |
| T 9 | t 4 | 0 | 1 | 1 | 0 | 1 | 0 | 1 | 1 |
| T 10 | t 4 | 0 | 0 | 1 | 0 | 0 | 1 | 1 | 0 |
| T 11 | t 4 | 1 | 1 | 1 | 0 | 0 | 0 | 1 | 0 |
| T 12 | t 4 | 0 | 1 | 0 | 1 | 1 | 1 | 1 | 0 |
| T 13 | t 4 | 0 | 0 | 1 | 1 | 0 | 1 | 0 | 1 |
| T 14 | t 4 | 0 | 0 | 0 | 1 | 0 | 0 | 1 | 1 |
| T 15 | t 4 | 1 | 1 | 1 | 1 | 0 | 0 | 0 | 1 |

Referring to the abovementioned table, in the bit timing signal T4 of the digit timing signal T1 the bit pattern of the coded signal generating circuit 21 is "1010", so that the bit pattern "1010" is stored in the retaining circuit 22 in the duration period of the digit timing signal T2. It can be seen that the output of the D type flip-flop TF4 to be fed to the AND gate G3 is "1110" in a bit timing sequence during the digit timing signal T1, and is "1011" in a bit timing sequence during the digit timing signal T2.

Assume a case where the key switch k1 has been depressed, and the digit timing signal T1 is retained in the D type flip-flop 24a through the key switch k1 during the duration period of the next digit timing signal T2, whereby the AND gate G3 is activated accordingly. During the duration period of the digit timing signal T2, the bit pattern of "1011" is supplied in a bit timing sequence, as described hereinabove, from the D type flip-flop TF4. The logical state pattern is inverted through the AND gate G3 and the NOR gate G5 and is stored in the shift register 25a as a bit pattern. The pattern "0100" stored in the shift register 25a uniquely identifies the depression of the key switch k1.

Assume a case where the key switch k2 has been depressed, similarly the inversion "1101" of the logical state pattern "0010" from the D type flip-flop TF4 is stored in the shift register 25a in a bit timing sequence during the duration period of the digit timing signal T3, and thus the depression of the key switch k2 is uniquely identified.

Figure 4:
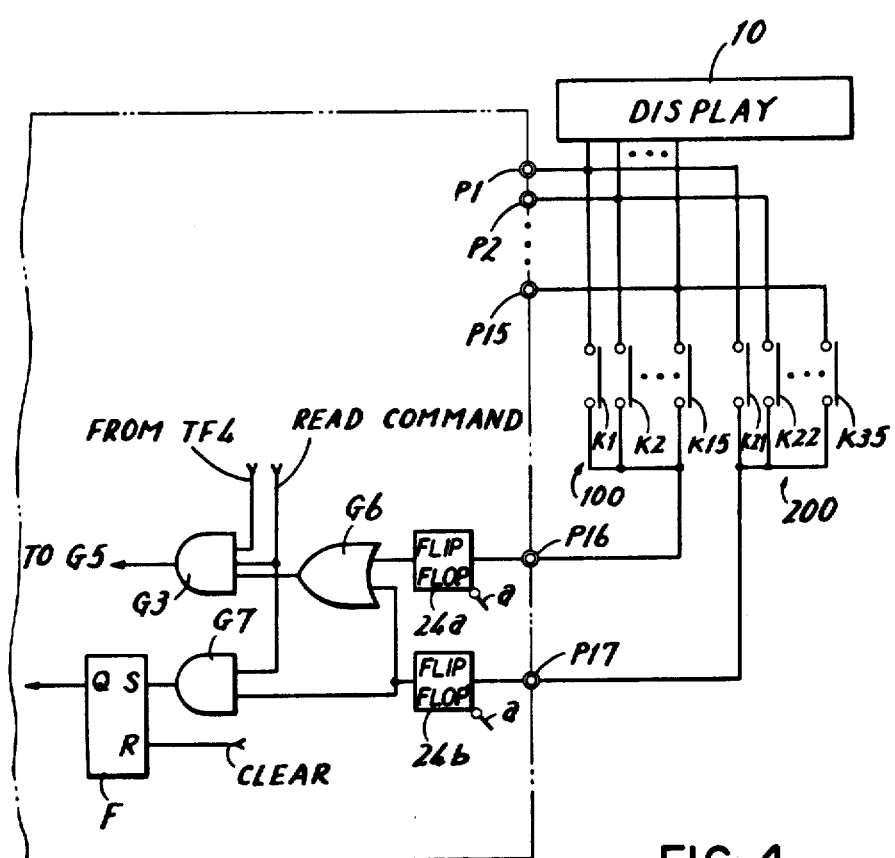
FIG. 4 is a schematic diagram of another embodiment of the present invention.

Referring to the embodiment of FIG. 2, the number of keys is a display unit number of the most. In a case where more keys are required, the keys are divided into a first group and a second group as shown in FIG. 4. The depressed key can be identified from the common output of each group.

The common outputs from key groups 100 and are stored in the D type flip-flop 24a and 24b respectively for one digit timing period through the input terminals P16 and P17, respectively. This stored output is inputted in the AND gate G3 through an OR gate G6. The stored output of the D type flip-flop 24b is also fed to one input of the AND gate G7. The output from the AND gate G7 sets a flip-flop F. A clear signal resets the flip-flop F. A set output Q from the flip-flop F shows that one of key switches K21 to K35 included in the second key group 200 has been depressed. The other circuit structure is substantially the same as the embodiment of FIG. 2.

Assume that the key switch K1 has been depressed during operation, and the digit timing signal T1 is stored in the D type flip-flop 24a through the key switch K1. The stored output enables the AND gate G3 during the digit timing signal T2. The bit pattern "1011" obtained from the D type flip-flop TF4 in a bit timing sequence during the duration period of the digit timing signal T2 is fed to the code memory register 25 through the AND gate G3. Also, a similar operation is effected even when the other keys K2 to K15 within the first key group 100 is depressed.

Assume a case where the key switch 21 within the second key group 200 is depressed, and the digit timing signal T1 is stored in the D type flip-flop 24b, through the key switch K21 and the input terminal P17, during the duration period of the next digit timing signal T2. The stored output of the D type flip-flop 24b enables the AND gate G3 through the OR gate G6. Therefore, the logical state pattern "1011" obtained from the D type flip-flop TF4 in a bit timing sequence during a period of the digit timing signal T2 is fed to the code memory register 25 through and AND gate G3. At the same time, the stored output of the D type flip-flop 24b sets the flip-flop F through the AND gate G7. The set output Q of the flip-flop F shows that one of key switches within the second key group 200 has been depressed.

Figure 5:
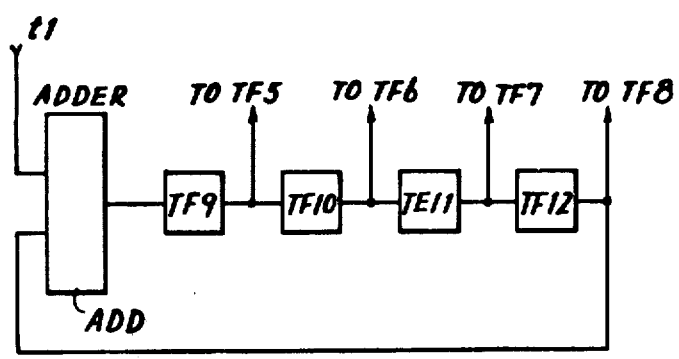
FIG. 5 shows a coded signal generating circuit of a further embodiment of the present invention.

As another embodiment of the present invention, a sequential type counter of FIG. 5 may be used instead of the circulating register of the coded signal generating circuit 21. In the sequential type counter, D type flip-flops TF9 to TF12 and an adder ADD forms a closed loop and can provide a bit pattern signal as described in the coded signal generating circuit 21 of FIG. 2.

Although, in the embodiment given above, there has been described a case where displaying signals and keying input signals are commonly used, it is needless to say that the present invention can be applied even a case where the digit timing signals are not used commonly with the displaying signals.

Although this invention has been described and illustrated in detail, it is to be clearly understood that the same is by wy of illustration and example only and is not to be taken by way of limitation, the spirit and scope of this invention being limited only by the terms of the appended claims.

What is claimed is:

1. A keying input apparatus comprising:
    means for providing sequentially different logic state pattern signals each being of a predetermined number of bits,
    a plurality of output terminals,
    a common terminal,
    means responsive to said different logic state pattern signals for providing a plurality of individual digit timing signals applied individually in a digit timing sequence to corresponding ones of said plurality of output terminals;
    a like plurality of keying input means selectively connected on one side thereof to respective ones of said plurality of output terminals and connected at the other side thereof commonly to said common terminal for applying, upon operation of any one of said keying input means, the corresponding one of said digit timing signals in said digit timing sequence to said common terminal ; and
    means responsive to a said corresponding one of said individual digit timing signals as selected through input operation of said keying input means for withdrawing from said logic state pattern signal providing means a coded signal uniquely identifying said operated keying input means.

2. A keying input apparatus in accordance with claim 1, in which said logic state pattern signal providing means comprises
    means for providing clock pulses, and
    means responsive to said clock pulses for generating sequentially a first predetermined plurality of different logic state pattern signals of said predetermined number of bits.

3. A keying input apparatus in accordance with claim 1, in which said logic state pattern signal providing means comprises:
    means providing clock pulses;
    a shift register operable in response to said clock pulses comprising first and second like pluralities of logic state storing units corresponding in number to said predetermined number of bits and storing bit patterns therein;
    said first storing units having outputs driving said second storing units in parallel to forcibly change the logic states of predetermined ones of said second storing units from corresponding one of said first storing units.

4. A keying input apparatus in accordance with claim 3, in which said means for generating clock pulses provides first and second clock pulse sequences;
    said first clock pulse sequence driving said first storing units and said second clock pulse sequence driving said second storing units in first and second timing intervals, respectively; and
    wherein said logic state of a predetermined storing unit out of said second plurality of logic state storing units is changed in response to said second clock pulse sequence and in accordance with said outputs of said corresponding first storing units.

5. A keying input apparatus in accordance with claim 4, wherein each bit occurs within a bit time;
    each digit timing signal occurs within a digit time; and
    wherein said first clock pulse sequence comprise first clock pulses occurring one for each bit time and said second clock pulse sequence comprises second clock pulses occurring one for each digit time;
    said digit time comprising a predetermined number of bit times corresponding to said predetermined number of bits; and
    said second clock pulse sequence enabling said second plurality of logic state storing units to accept said outputs from corresponding ones of said first storing units to assume the respective states of the latter at the bit time corresponding to the completion of eaach digit time.

6. A keying input apparatus in accordance with claim 1, in which said logic state pattern signal providing means comprises:
    means for providing clock pulses, said clock pulses defining bit timing and digit timing intervals;
    means responsive to said clock pulses for generating sequentially a first predetermined plurality of different logic state pattern signals of said predetermined number of bits one at each said bit timing interval; and
    means responsive to said clock pulses and said first plurality of logic state pattern signals for generating a second plurality of logic state pattern signals one at each of said digit timing intervals;
    each said digit timing interval including a plurality of bit timing intervals corresponding to said predetermined number of bits.

7. A keying input apparatus in accordance with claim 1, in which said logic state pattern signal providing means comprises:
    means for providing clock pulses defining bit timing and digit timing intervals;
    means responsive to said clock pulses for generating sequentially a first predetermined plurality of different logic state pattern signals of said predetermined number of bits, one at each said bit timing interval; and
    means responsive to said clock pulses and said first plurality of logic state pattern signals for generating a second plurality of logic state pattern signals, one at each of said digit timing intervals;
    each said digit timing interval including a plurality of bit timing intervals corresponding to said predetermined number of bits; and
    further, in which said digit timing signal providing means comprises a matrix having a plurality of inputs driven by selected bits in said second plurality of logic pattern signals and having a plurality of outputs providing a like plurality of digit timing signals corresponding to said second plurality of logic pattern signals 8. A keying input apparatus in accordance with claim 9, in which said matrix comprises column lines driven individually by predetermined ones of said selected bits in said second plurality of logic state pattern signals;
   row lines connected to respective ones of said plurality of outputs; and
   control means provided at predetermined intersections between said column and row lines for effecting a conversion from each of said logic state pattern signals on said column lines to a said digit timing signal on a corresponding one of said row lines.

9. A keying input apparatus in accordance with claim 8, in which each of said control means comprises a switching device operable in response to said logic state of said column line associated wherewith.

10. A keying input apparatus in accordance with claim 9, in which each of switching device is a field effect device.

11. A keying input apparatus in accordance with claim 10, in which each said field effect device is a MOS field effect transistor.

12. A keying input apparatus in accordance with claim 1, in which means for withdrawing a coded signal comprises:
   gate means responsive to a digit timing signal as selected through input operation of said keying input means for allowing said coded signal to be passed through said gate means; and
   a circulation shift register interconnected with said logic state pattern signal providing means through said gate means for storing said passed coded signal;
   said coded signal comprising one of said logic state pattern signals representative of the identity of said digit timing signal.

13. A keying input apparatus in accordance with claim 3, in which said means for withdrawing a coded signal commmprises:
   gate means responsive to a digit timing signal as selected through input operation of said keying input means for allowing a logic state output from a predetermined logic state storing unit of said shift register to be transferred through said gate means for the subsequent digit timing, and
   a circulation shift register interconnected with said logic state pattern signal providing means for storing said transferred signal, said transferred signal constituting said coded signal;
   said coded signal comprising one of said logic state pattern signals representative of the identity of said digit timing signal.

14. A keying input apparatus in accordance with claim 1, in which said plurality of keying input means comprises a plurality of groups,
   each group comprising a plurality of keying input means connected individually with a respective one of digit timing signals, and which further comprises means for identifying a group to which said operated keying input means pertains, said coded signal and an output from said group identifying means uniquely identifying said operated keying input means.

15. A keying input apparatus comprising:
   means for providing sequentially different logic state pattern signals each being of a predetermined number of bits;
   a plurality of output terminals;
   a common terminal;
   means responsive to said different logic state pattern signals for providing a plurality of individual digit timing signals in a digit timing sequence much that each digit timing signal is individually provided at a corresponding one of said plurality of output terminals
   means for displaying information, said means having a plurality of digit display positions each connected individually to a corresponding one of said plurality of output terminals to be responsive to said digit timing signals for displaying information in said digit timing sequence;
   a plurality of keying input means each having one terminal connected individually to a corresponding one of said output terminals and the other terminal connected to said common terminal for applying, upon operation of any one of said keying input means, the corresponding one of said individual digit timing signals to said common terminal; and
   means responsive to a digit timing signal applied to said common terminal through said operated one of said keying input means for withdrawing from said logic state pattern signal providing means a coded signal uniquely identifying said operated keying input means.

16. A keying input apparatus, comprising:
   means for providing clock pulses;
   means responsive to said clock pulses for generating sequentially a first plurality of different logic state pattern signals, each comprising a different pattern of logic states of a plurality of bits;
   a plurality of output terminals;
   a common terminal;
   means responsive to said different pattern of logic states of said plurality of bits of said sequentially provided first plurality of different logic state pattern signals for providing a plurality of individual digit timing signals in a digit timing sequence such that each digit timing signal is individually provided at a corresponding one of said plurality of output terminals;
   means for displaying information, said means having a plurality of digit display positions each connected individually to a corresponding one of said plurality of output terminals to be responsive to said digit timing signals for displaying information in said digit timing sequence;
   a plurality of keying input means, each having one terminal connected individually to a corresponding one of said output terminals and the other terminal connected to said common terminal for applying, upon operation of any one of said keying input means, the corresponding one of said individual digit timing signals in the digit timing sequence to said common terminal; and
   means responsive to a digit timing signal applied to said common terminal through said operated one of said keying input means for withdrawing from said logic state pattern signal providing means a corresponding logic state pattern signal in the form of a coded signal uniquely identifying said operated keying input means.

17. A keying input apparatus, comprising:
   means for providing clock pulses;
   means response to said clock pulses for generating sequentially a first plurality of different logic state pattern signals, each comprising a different pattern of logic states at a plurality of bit positions;
a plurality of output terminals;
a common terminal;
means responsive to said different pattern of logic states of said plurality of bits of said sequentially provided first plurality of different logic state pattern signals for providing a plurality of individual digit timing signals in a digit timing sequence such that each digit timing signal is individualy provided at a corresponding one of said plurality of terminals;
means for displaying information, said means having a plurality of digit display positions each connected individually to a corresponding one of said plurality of output terminals to be responsive to said digit timing signals for displaying information in said digit timing sequence;
a plurality of keying input means, each having one terminal connected individually to a corresponding one of said output terminals and the other terminal connected to said common terminal for applying, upon operation of any one of said keying means the corresponding one of said individual digit timing signals in said digit timing sequence to said common terminal;
means responsive to said clock pulses for generating a plurality of bit timing signals in synchronism with said clock pulses, each of said plurality of digit timing signal covering an interval including said plurality of bit timing signals;
means responsive to a predetermined bit timing signal of each digit timing signal and to a digit timing signal applied to said common terminal through said operated one of said keying input means for withdrawing from said logic state pattern signal providing means a corresponding logic state pattern signal at the time of said predetermined bit timing signal of said digit timing signal in the form of a coded signal uniquely identifying said operated keying input means.

18. A keying input apparatus, comprising:
means for providing clock pulses;
means responsive to said clock pulses for generating sequentially a first plurality of different logic state pattern signals, each comprising a different pattern of logic states of a plurality of bits;
a plurality of output terminals;
a common terminal; means responsive to said different pattern of logic states of said plurality of bits of said sequentially provided first plurality of different logic state pattern signals for providing a plurality of individual digit timing signals in a digit timing sequence such that each digit timing signal is individually provided at a corresponding one of said plurality of output terminals;
means for displaying information, said means having a plurality of digit display position each connected individually to a corresponding one of said plurality of output terminals to be responsive to said digit timing signals for displaying information in said digit timing sequence;
a plurality of keying input means, each having one terminal connected individually to a corresponding one of said otput terminal connected to said common terminal for applying, upon operation of any one of said keying input means, the corresponding one of said individual digit timing signals in said digit timing sequence to said common terminal; and gate means responsive to a digit timing signal applied to said common terminal through said operated one of said keying input means for allowing a corresponding logic state signal to be transferred from said logic state pattern signal providing means; and
a circulation shift register driven by said gate means for storing said transferred signal, said transferred signal constituting a coded signal uniquely identifying said operated keying input means.

19. A keying input apparatus comprising:
means for providing clock pulses defining bit timing and digit timing intervals;
means responsive to said clock pulses for generating sequentially a first predetermined plurality of different logic state pattern signals of a predetermined number of bits one at each said bit timing interval
said means for generating said first plurality of logic state pattern signals comprising
 shift register means operable in response to said clock pulses comprising a plurality of logic state storing units corresponding in number to said predetermined number of bits, and
 means operatively coupled to said shift register means for changing forcibly a logic state of a predetermined unit of said logic state storing units, whereby said first plurality of different logic state pattern signals each being of said predetermined number of bits are generated sequentially,
means responsive to said clock pulses and said first plurality of logic state pattern signals for generating a second plurality of logic state pattern signals one at each of said digit timing intervals,
each said digit timing interval including a plurality of bit timing intervals corresponding to said predetermined number of bits
a plurality of output terminals,
a common terminal,
means responsive to said second plurality of different logic state pattern signals for providing a plurality of individual digit timing signals in a digit timing sequence individually at said plurality of output terminals, respectively,
a plurality of keying input means connected at one end thereof individually to said plurality of output terminals and connected at the other ends thereof commonly to said common terminal for applying, upon operation of any one of said keying input means, the corresponding one of said individual digit timing signals at the corresponding digit timing interval to said common terminal,
means responsive to said clock pulses for generating a plurality of bit timing signals in synchronism with said clock pulses, each of said plurality of digit timing signals covering an interval including said plurality of bit timing signals and
means responsive to a predetermined bit timing signal of each digit timing signal and to a digit timing signal applied to said common terminal through said operated keying input means for withdrawing from said first logic state pattern signal providing means a corresponding one of said first plurality of logic state pattern signals at the time of said predetermined bit timing signal of said digit timing signal in the form of a bit series coded signal uniquely indentifying said operated keying input means.

20. A keying input apparatus in accordance with claim 19, wherein said withdrawing means comprises gate means responsive to a digit timing signal applied to said common terminal through said operated keying input means for allowing a corresponding logic state signal to be transferred from said first logic state pattern signal generating means; and a circulation shift register driven by said gate means for storing said transferred signal, said transferred signal constituting a bit series coded signal uniquely indentifying said operated keying input means.

21. A keying input apparatus in accordance with claim 2, in which said logic state pattern signal providing means comprises a shift register operable in response to said clock pulses comprising a plurality of logic state storing units corresponding in number to said predetermined number of bits, and means operatively coupled to said shift register for changing forcibly a logic state of a predetermined unit of said plurality of logic state storing units, whereby said different logic state pattern signals each being of said predetermined number of bits are provided sequentially.

22. A keying input apparatus in accordance with claim 21, in which said means for changing forcibly a logic state of a predetermined unit comprises means responsive to a logic state of a predetermined unit of said plurality of logic state storing units for changing forcibly a logic state of said predetermined unit of said plurality of logic state storing units.

23. A keying input apparatus in accordance with claim 21, in which said means for changing forcibly a logic state of a predetermined unit comprises means responsive to a predetermined bit timing pulse and an output from said shift register for imputting a sum of said bit timing pulse and said output from said shift register into said shift register; and which further comprises means coupled to said means for providing clock pulses for generating bit timing signals, said digit timing signal including said bit timing signals.

* * * * *